(12) United States Patent
Burgoon (10) Patent No.: US 9,441,690 B2
(45) Date of Patent: Sep. 13, 2016

(54) AIR COOLED PISTON CAP ASSEMBLY

(75) Inventor: Donald L. Burgoon, Gastonia, NC (US)

(73) Assignee: PERFORMANCE FRICTION CORPORATION, Clover, SC (US)

(*) Notice: Subject to any disclaimer, the term of this patent is extended or adjusted under 35 U.S.C. 154(b) by 0 days.

(21) Appl. No.: 14/111,711

(22) PCT Filed: Apr. 12, 2012

(86) PCT No.: PCT/US2012/033291
§ 371 (c)(1),
(2), (4) Date: Oct. 14, 2013

(87) PCT Pub. No.: WO2012/142264
PCT Pub. Date: Oct. 18, 2012

(65) Prior Publication Data
US 2014/0041970 A1   Feb. 13, 2014

Related U.S. Application Data (60) Provisional application No. 61/475,574, filed on Apr. 14, 2011.

(51) Int. Cl.
*F16D 65/18* (2006.01)
*F16D 65/847* (2006.01)
*F16D 125/06* (2012.01)

(52) U.S. Cl.
CPC ............ *F16D 65/18* (2013.01); *F16D 65/847* (2013.01); *F16D 2125/06* (2013.01)

(58) Field of Classification Search
CPC ...... F16D 65/16; F16D 65/18; F16D 65/847; F16D 55/226; F16D 65/005; F16D 65/0075; F16D 65/06; F16D 65/091; F16D 65/092; F16D 65/0971; F16D 55/225; F16D 55/2265; F16D 55/28; F16D 2055/0004; F16D 2121/04
USPC ........................... 188/72.4, 73.3, 72.1, 73.37
IPC ................................. F16D 65/14, 65/20, 55/22
See application file for complete search history.

(56) References Cited

U.S. PATENT DOCUMENTS

| | | | | |
|---|---|---|---|---|
| 3,112,014 A | * | 11/1963 | Jeffries | F16D 55/228 188/18 A |
| 4,022,300 A | * | 5/1977 | Afanador | F16D 55/224 188/71.9 |

(Continued)

FOREIGN PATENT DOCUMENTS

| | | | |
|---|---|---|---|
| JP | 11030258 A | * | 2/1999 |
| JP | 2010190405 A | * | 9/2010 |
| RU | 2258162 C2 | | 8/2005 |

OTHER PUBLICATIONS

International Search Report of PCT/US2012/033294 dated Jul. 12, 2012.

(Continued)

*Primary Examiner* — Robert A Siconolfi
*Assistant Examiner* — San Aung
(74) *Attorney, Agent, or Firm* — Roberts Mlotkowski Safran Cole & Calderon, P.C.

(57) ABSTRACT

An air-cooled piston cap assembly is provided for use in a disc brake caliper that includes a piston cap, and a piston body having a proximal end and a distal end which is slidably movable within a caliper bore along an axis. The piston cap includes a retention portion mounted within the distal end of the piston body, a contact portion located opposite from the retention portion that contacts a brake pad assembly, and an intermediate portion connecting the retention portion with the contact portion. The outer surface of the intermediate portion defines an extended heat exchange path between the contact portion and the retention portion, and may for example hourglass-shaped. An air gap is provided between a top edge of the piston body and an undersurface of the contact portion of the piston cap that allows air to circulate over the extended heat transfer path defined by the outer surface of the contact portion and intermediate portion to cool the cap from frictional heat generated during braking. The contact portion of the piston cap is shaped such that only a part of the surface of the contact portion contacts the brake pad assembly to advantageously reduce both conductive heat transfer and noise during a braking operation.

8 Claims, 5 Drawing Sheets

(56) References Cited

U.S. PATENT DOCUMENTS

| | | | |
|---|---|---|---|
| 4,537,289 A * | 8/1985 | VonGrunberg | F16D 65/0979 188/264 G |
| 4,581,985 A | 4/1986 | Villata | |
| 5,009,291 A | 4/1991 | Castellano | |
| 5,031,511 A * | 7/1991 | Villata | F16D 65/84 188/71.6 |
| 5,921,356 A * | 7/1999 | Stringer, III | F16D 65/18 188/196 D |
| 7,066,303 B2 * | 6/2006 | Malagoli | F16D 65/847 188/264 A |
| 7,156,212 B1 * | 1/2007 | Ciotti | F16D 55/228 188/72.4 |
| 2005/0194220 A1 | 9/2005 | Edmisten | |

OTHER PUBLICATIONS

European Search Report of European Application No. 12771907.8 dated Nov. 5, 2014.

* cited by examiner

AIR COOLED PISTON CAP ASSEMBLY

FIELD

This invention generally relates to piston cap assemblies, and is specifically concerned with an air-cooled piston cap assembly for use in brake calipers.

BACKGROUND

Pistons are used in caliper disc brakes to forcefully engage brake pad assemblies or pads against a brake rotor in order to stop the wheels of automotive vehicles. Such pistons are generally comprised of a hollow piston body slidably mounted in the bore of a brake caliper that is connected to an actuator such as a source of pressurized brake fluid. When the piston body is acted on by pressurized brake fluid, it forcefully slides in the caliper bore toward the brake pad. The distal end of the piston body engages the brake pad and pushes it against the brake rotor in order to slow or stop the wheel of a vehicle.

Such forceful engagement and the resulting high frictional forces generate considerable heat which can damage the disc brake mechanism over time by overheating and deteriorating the seals and thermally fatiguing the caliper body and components. Additionally, heat generated within the brake pad and conducted through the piston body can cause the brake fluid behind the piston body to boil, thereby compromising the braking action and causing an unsafe condition for the driver.

To solve these problems, heat insulated piston cap assemblies have been developed which comprise a hollow piston body having a closed end and an open end, and a piston cap having a brake pad engaging portion, and a retention portion mounted to the open end of the piston body. A heat insulating ring is provided between the interface of the piston body and the retention portion of the piston cap to prevent heat from being conducted to the brake fluid via the piston body. While such heat insulating rings are effective for this purpose, they are formed from relatively expensive materials such as a ceramic filled polymer or other materials which can significantly increase the cost of the piston cap assembly.

SUMMARY

Clearly, there is a need for a brake piston that prevents the frictional heat generated within the brake pad from warping and corroding the brake-engaging end of the piston and causing the brake fluid behind the piston to boil. The invention solves the aforementioned problems by means of a unique piston cap assembly that provides a heat dissipating path between the brake-pad contacting portion of the cap and the retention portion of the cap that promotes the air-cooling of the cap. To these ends, the piston cap assembly of the invention comprises a piston body slidably movable within a caliper bore along an axis and having a closed end in contact with hydraulic fluid, and an opposite end; a piston cap having a retention portion mounted on the opposite end of the piston body, a contact portion opposite from the retention portion that contacts a brake pad assembly, and an intermediate portion connecting the retention portion with the contact portion. The contact portion and the intermediate portion are shaped so as to extend the heat transfer path between the brake pad assembly and the piston body to be longer than a linear path along the axis of rotation of the piston cap assembly. An air gap is provided in the piston cap that allows air to circulate over the heat exchange path defined by a surface of the intermediate portion.

The extension of the heat transfer path may be accomplished by providing a non linear path between the contact portion of the piston cap and the piston body forcing a longer distance of thermal conductivity.

The contact portion of the piston cap preferably includes a contact surface having an area that is less than the full cross sectional area of the contact portion. Such a design results in less conductive heat transfer between the backing plate of the brake pad assembly and the piston cap than would otherwise occur if the contact surface included the full area of the contact portion of the cap. In one example of the invention, the cross section of the contact portion is circular but the contact surface is annular. Such an annular shape of the contact surface also advantageously directs this lesser amount of conducted heat toward a heat-dissipating path along the outer or inner surface of the contact portion which is exposed to circulating air. Moreover, applicants have found that, in many cases, strategically placed contact surfaces having a smaller area than the full cross sectional area of the contact portion also allow the piston cap to advantageously absorb the vibration produced when the cap forcefully pushes the brake pad against the rotor of the caliper brake, thereby substantially reducing the amount of noise generated during a braking operation.

The applicants have discovered examples of both annular-shaped and domed-shaped contact surfaces that perform the dual function of reducing conductive heat transfer and reducing brake noise. However, the invention is not confined to these particular shapes. Moreover, the applicants have discovered some noise-reducing embodiments of the invention where the area of the contact surface is larger than the cross sectional area of the contact portion of the piston cap. While such embodiments do not have the advantage of reducing conductive heat transfer at the brake/cap interface they are still within the scope of the invention as they function to reduce brake noise and still include a heat dissipating path between the brake-pad contacting portion of the cap and the retention portion of the cap that promotes an air insulation barrier between the piston and the cap and enhances cooling.

The piston cap assembly of the invention may also include a connecting assembly that affixes a brake pad to the contact portion of the piston cap. The connecting assembly may include a mounting plate, a mounting ring that detachably connects the mounting plate to a periphery of the contact portion, and a fastener that affixes the brake pad to the mounting plate. The mounting ring may snap-fit into annular grooves circumscribing the mounting plate and a peripheral portion of the contact portion in order to detachably connect the mounting plate to the periphery of the contact portion. Such a connecting assembly allows the elastomeric seal or a spring ring, which allows some free perpendicular movement to the axial travel of the piston engagement and retraction travel, while forcefully withdrawing the brake pad assembly after the vehicle operator disengages the brake pedal, thereby advantageously reducing parasitic brake drag caused by residual contact between the brake pad and rotor of the caliper brake immediately following a braking operation.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention generally relates to piston cap assemblies, and is specifically concerned with an air-cooled piston cap assembly for use in brake calipers. According to aspects of the invention, the piston body and cap of a piston cap assembly are structured and arranged such that there is an extended heat transfer path between the brake-pad contacting portion of the cap and the retention portion of the cap mounted to the piston body. An air gap between the piston cap and piston body allows a flow of air around the heat transfer path that promotes the air insulating and cooling of the piston cap. There may also be a heat sink in an intermediate portion of the cap that absorbs heat from the brake-pad contacting portion during a braking operation. There may be a recess in the brake pad-contacting portion of the piston cap that directs heat received by the brake pad to the periphery of the contacting portion of the piston cap and from thence to the heat transfer path. All of these features are described in detail hereinafter. In a first alternative embodiment, a connecting assembly affixes the brake pad to the contact portion of the piston cap so that the brake pad is positively withdrawn from the rotor of the brake, thereby advantageously reducing parasitic brake losses. In a second alternative embodiment, the piston cap includes an open end that promotes cooling along the inner walls of the cap. In this manner, implementations of the invention provide a piston cap assembly that adequately transmits the braking force from the piston to the pad while decreasing heat transfer from the pad into the piston. Additionally, the contact surface of the piston cap may be shaped to substantially reduce brake noise, as described hereinafter.

Figure 1:
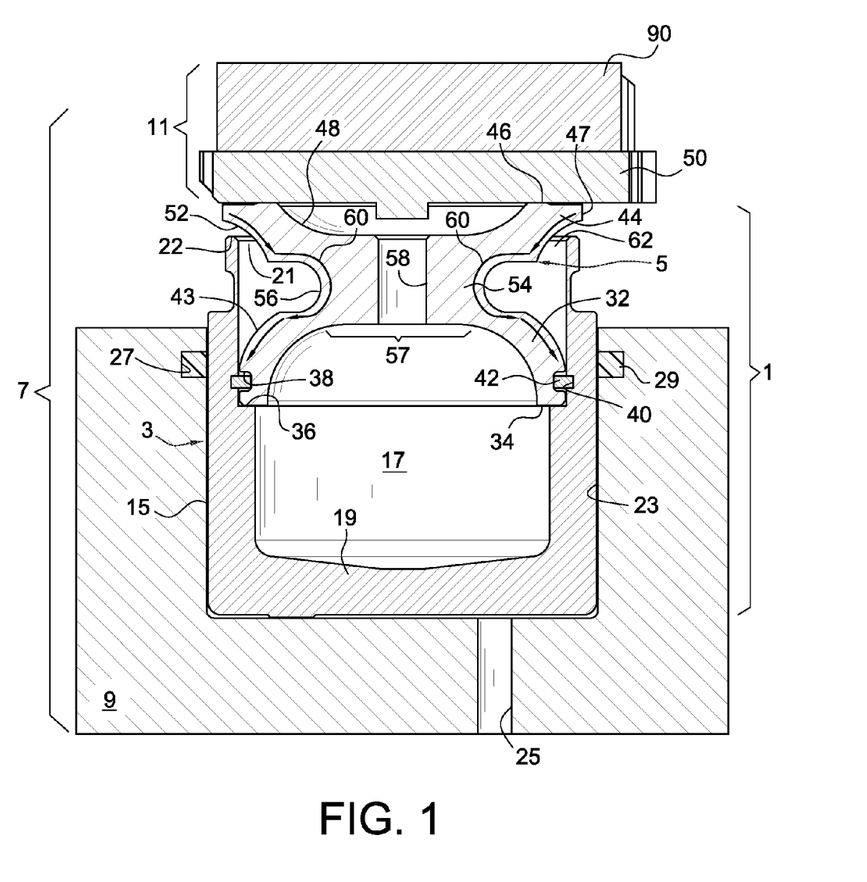
FIG. 1 is a side sectional view of the air cooled piston cap assembly of the invention installed in a caliper brake.
Figure 2:
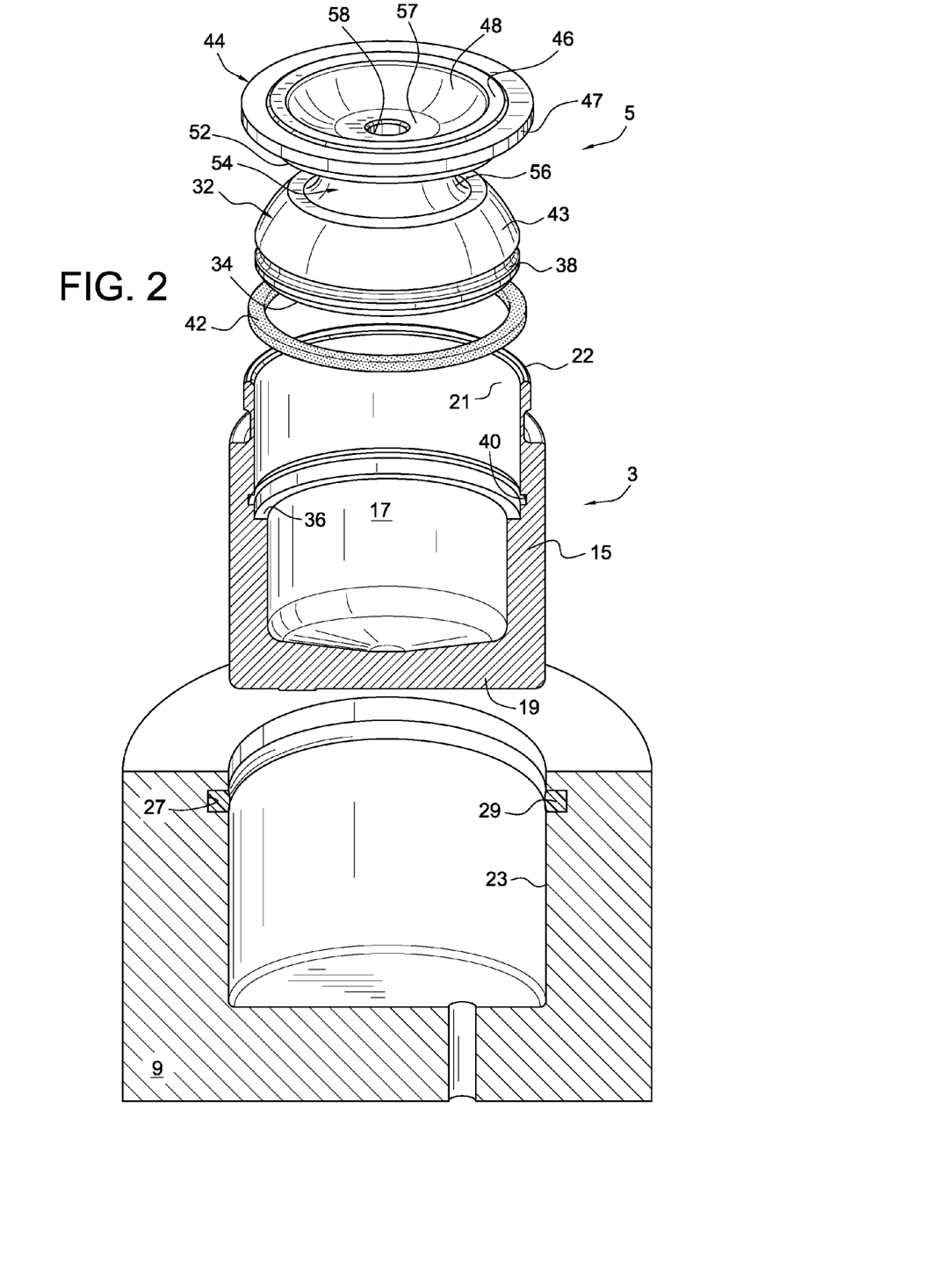
FIG. 2 is a sectional, perspective view of the air cooled piston cap of FIG. 1 shown in exploded form.

With reference now to FIGS. 1 and 2, wherein like reference numerals designate like components throughout all of the several figures, the piston cap assembly 1 of the invention includes a piston body 3 and a piston cap 5 which may be used, for example, in caliper brakes 7 that include a caliper housing 9 and a brake pad 11. The piston body 3 and piston cap 5 may be composed of metal, stainless steel, metal alloy, or any other suitable composition, preferably with a low thermal conductivity. The piston body 3 and piston cap 5 may have the same or different compositions.

The piston body 3 comprises a cylindrical side wall 15, a hollow interior 17, a closed end 19, and an open end 21 terminating in a top edge 22. The piston body 3 is slidably received within a bore 23 in the housing 9 of the caliper brake 7. The housing 9 includes a brake fluid passage 25 that communicates pressurized brake fluid to the closed end 19 of the piston body 3, as well as an annular groove 27 that houses an elastomeric seal 29 (shown in simplified form). The elastomeric seal 29 tightly engages the cylindrical side wall 15 of the piston body 3 to effectively seal in the pressurized braking fluid. Such tight engagement also causes it to stretch a short distance (e.g. 150 microns) toward the brake pad 11 during a braking operation. The restorative force generated by such stretching causes the elastomeric seal 29 to resiliently withdraw the piston cap assembly 1 downwardly in the bore 23 after the brake fluid is depressurized by the operator releasing the brake pedal (not shown).

The piston cap 5 includes a retention portion 32 that is structured and arranged to be received in the open end 21 of the piston body 3. The retention portion 32 includes a load bearing surface 34 that rests against an annular ledge 36 of the piston body 3 when the piston cap 5 is arranged in the piston body 3. The retention portion 32 also includes a cap annular groove 38 that is substantially aligned with a body annular groove 40 of the piston body 3. A spring retention ring 42 may be held in the body annular groove 40 and correspondingly received in the cap annular groove 38 for holding the piston cap 5 in a substantially fixed spatial relationship with the piston body 3. The spring ring retention system, e.g., retention ring 42, cap annular groove 38 and body annular groove 40 ensures positive engagement between the piston body 3 and the piston cap 5.

The piston cap 5 additionally includes a pad contacting portion 44 having an annular contact surface 46. The annular contact surface 46 protrudes slightly from the front end of the pad contacting portion 44 and engages the backing plate 50 of the brake pad 11 during operation. The annular contact surface 46 is located between a circular outer edge 47 of the contacting portion 44 and a dish-shaped recess 48 provided on the top surface of the contacting portion 44. The contact surface 46 may be radially shorter than shown, or radially long enough to subsume the entire area between the outer edge 47 of the contacting portion 44 and the outer edge of the dish-shaped recess 48. When the radial extent of the contact surface is less than the area between the outer edge 47 of the contacting portion and the outer edge of the dish-shaped recess 48, it may be located at any position between the circular outer edge 47 of the contact portion and the outer edge of the dish-shaped recess 48 (although some positions are preferable to others as will be discussed hereinafter). The annular contact surface 46 may have a flat profile (as shown) or it may have a semi-annular profile so as to engage the backing plate with a relatively small area of contact.

During a braking operation, the annular contact surface 46 forcefully engages against the backing plate 50 of the brake pad 11 in order to press the brake pad against the rotor (not shown) of the caliper brake 7. In all cases, despite the specific extent or specific profile of the annular contact surface 46, the annular shape of the contact surface 46 reduces the amount of surface area contact between the piston cap 5 and the backing plate 50 of the brake pad 11 which in turn reduces conductive heat transfer between the backing plate 50 and the piston cap 5 while directing the heat toward a heat-dissipating path that tracks the underside 52 of the pad contacting portion 44. In addition, the selection of a specific radial extent, radial location, and profile shape of the annular contact surface 46 of the contact portion 44 may advantageously be made with respect to a specific brake pad 10 in order to eliminate or at least reduce the amount of vibration and noise that the brake pad 10 undergoes when forcefully engaging the rotor of the caliper brake 7.

The table below summarizes the noise generated when piston caps 5 having three different sizes of annular contact surfaces 46 are used to press the brake pad 11 against the rotor of a caliper brake:

| Dynamometer Procedure | Piston Cap | Outer Diameter (mm) | Inner Diameter (mm) | Noise Occurences (>70 dB) |
|---|---|---|---|---|
| Simulated LACT | Design #1 | 35.56 | 32.16 | 1.2 |
| Simulated LACT | Design #2 | 21.45 | 15.16 | 7.4 |
| Simulated LACT | Design #3 | 44.00 | 41.30 | 2.6 |

In the table above, the measured engagement forces of the piston cap 5 against the brake pad 11 are the same as the forces used in a simulated "Los Angeles City Traffic Route" (LACT), which is the test standard used in the industry by original equipment manufacturers (OEMs) to measure and compare vehicle brake noise occurrence rates.

The foregoing table displays the number of times the amount of brake noise exceeds 70 decibels during a simulated braking operation. The data in this table indicate that such brake noise is highly dependent on the design of the contact surface 46 of the piston cap. This data indicates that certain designs of the piston cap 5 are much better at dampening and otherwise reducing the vibration between the brake pad 11 and rotor that causes such noise during braking. In particular, this table demonstrates that the amount of noise exceeding 70 dB can be reduced by a factor of five upon the proper selection of the inner and outer diameter lengths of the annular contact surface 46. Additionally, the size and shape of the dish-shaped recess 48 and/or curved sidewall 22 is preferably structured and arranged to achieve deflection of less than 20 microns under a braking load so as not to unduly increase the stroke of the brake pedal. The invention is not limited to a 20 micron deflection, however, and the cap 5 can be structured and arranged to achieve any desired deflection.

The piston cap 5 further includes an intermediate portion 54 integrally connecting the retention portion 32 and the pad contacting portion 44. Intermediate portion 54 is defined by an annular recess 56 that circumscribes the piston cap 5 around its axis of rotation in mid-section which in turn. As is evident in FIG. 1, the walls of the intermediate portion 54 are formed from solid metal that is integrally connected to and thicker than the walls of the retention portion 32 and the pad contacting portion 44. These walls of the intermediate portion 54 constitute a heat sink portion 57 where heat generated from the frictional engagement of the brake pad 90 against the rotor of the caliper brake 7 can be absorbed.

As best seen in FIG. 1, the curved, dome-like surface 43 of the retention portion 32, the underside 52 of the pad-contacting portion 44, and the annular recess 56 circumscribing the intermediate portion 54 give the piston cap 5 distinctive hourglass-shaped side walls in which the cross sectional area of the intermediate portion 54 is substantially smaller than that of the cross sectional area of the retention portion 32 and the pad contacting portion 44 of the piston cap 5. As shown in FIG. 1, these hourglass-shaped side walls define a circuitous heat exchange path 60 for conductive heat transfer from the pad contacting portion 29 to the retention portion 32 and into the piston body 3. Preferably the curvature of these side walls defined by the surfaces 43, 52 and 56 is such that the heat exchange path 60 is substantially longer (e.g., one and a half to twice as long) than a straight-line distance from the pad contacting portion 29 to the retention portion 32, which would be the case if the side walls of the piston cap 5 were cylindrical. Additionally an annular air gap 62 is defined between the underside 52 of the pad contacting portion 44 of the piston cap 5 and the top edge 22 of the piston body 3. Air gap 62 decreases heat transfer between the backing plate 50 and the piston body 3 by eliminating a contact area between the top edge 22 of the piston body 3 and the curved undersurface 52 of the contact portion 44 which would short circuit the heat exchange path 60. Even more importantly, air gap 62 allows ambient air to flow through the air volume 63 defined between the hourglass-shaped outer walls of the piston cap 5 and the cylindrical inner wall of the piston body so as to cool the cap 5 during movement of the motor vehicle that the caliper brake 7 is installed in.

In operation, when the vehicle driver depresses a brake pedal, pressurized brake fluid flows through the passage 25 in the caliper brake housing 9 and hydraulically forces the piston cap assembly 1 through the bore 23 and into engagement with the brake pad 11 of the caliper brake 7. At the time, the elastomeric seal ring 29 is stretched toward the brake pad 11 to accommodate the movement of the piston body 3 through the bore 23. This action in turn forces the pad 90 of the brake pad 11 into frictional engagement with the rotor (not shown) of the caliper brake, thereby slowing or stopping the vehicle. The heat generated by this frictional engagement is conducted back through the pad 90, backing plate 50, and pad contacting portion 44 of the piston cap 5. The annular shape of the contact surface 46 of the pad contacting portion 44 reduces the amount of surface area contact between the piston cap 5 and the backing plate 50 of the brake pad 11 which in turn reduces conductive heat transfer between the backing plate 50 and the piston cap 5 while directing the heat toward a heat conductive path 60. The combination of the heat sink 57 the increased length of the heat conductive path 60 along the sidewalls 43, 52 and 56, and the air cooling of these walls by the circulation of air through air gap 62 substantially reduces the amount of conductive heat transfer that would otherwise occur between the pad-contacting portion 29 and the retention portion 32 if the side walls of the piston cap 5 were cylindrical. When the vehicle driver releases the brake pedal, the brake fluid flowing through passage 25 is de-pressurized, whereupon the restorative force generated by the stretching of the elastomeric seal ring 29 pulls the piston body 3 and piston cap 5 out of engagement with the brake pad 11. Relative torsional forces then cause the brake pad 11 and the rotating rotor to ultimately separate, thereby ending the braking action.

Figure 3:
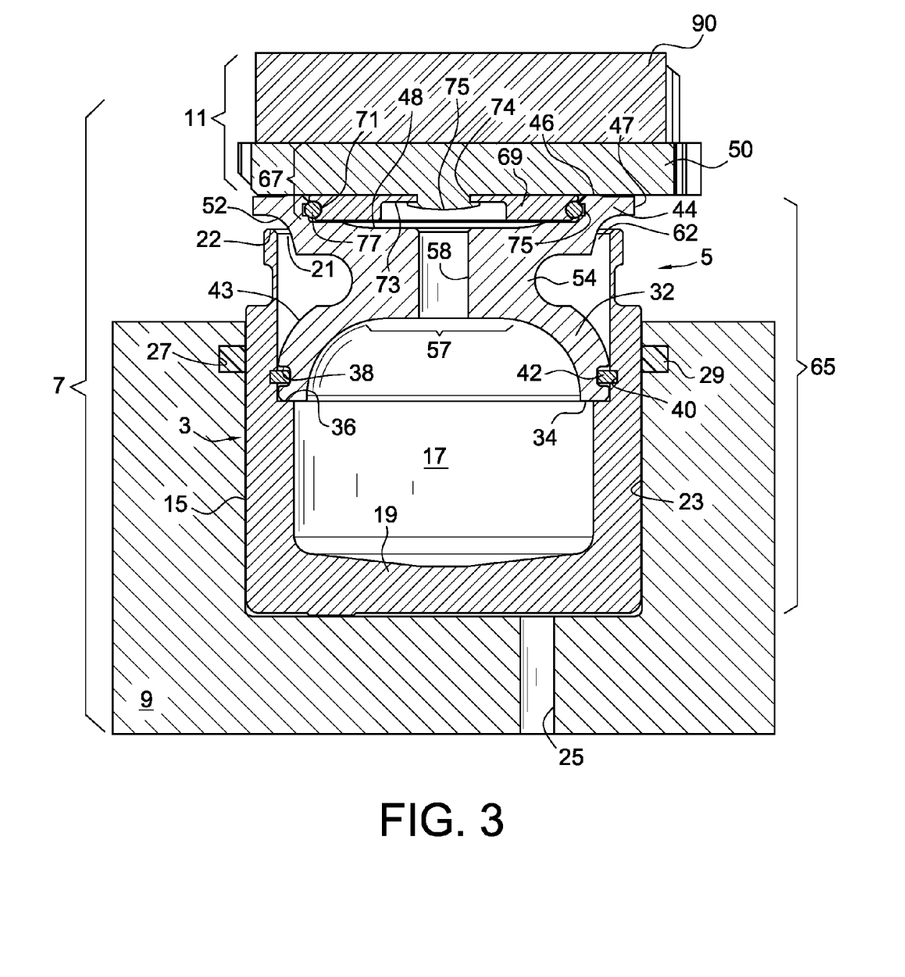
FIG. 3 is a side sectional view of a second embodiment of the air cooled piston cap assembly installed in a caliper brake.

FIG. 3 illustrates an alternative embodiment of the piston cap assembly 65 that positively retracts the brake pad 11 from the rotor (not shown) of the caliper brake 7 when the brake pedal is released in order to eliminate parasitic braking. To this end, the piston cap assembly 65 includes a connecting assembly 67 that provides a mechanical connection between the piston cap 5 and the backing plate 50 of the brake pad 11. Connecting assembly 67 includes a disc-shaped mounting plate 69. The outer edge of plate 69 is circumscribed by an annular groove 71, while the inner portion of the plate 69 includes a disc-shaped recess 73 that circumscribes a central opening 74. Central opening 74 receives a boss 75 that protrudes from the rear of the backing plate 50. The distal end of the boss 75 is peened down to form a narrow flange as shown to secure the mounting plate 69 to the brake pad 11. Mounting plate 69 is received within the recess 48 on top of the pad contacting portion 44 of the piston cap 5, which has been modified from the dish-shape used in the first embodiment to a disc-shape that complements the shape of plate 69. Like the side wall of the plate 69, the side wall of the plate-receiving recess 48 includes an annular groove 76. A spring retention ring 77 is seated in the grooves 71 and 76 to secure the mounting plate 69 to the pad contacting portion 44 of the piston cap 5.

The alternative piston cap assembly 65 operates in all respects like the previously-described piston cap assembly 1, the only exception being that the restorative force that the elastomeric seal ring 29 applies to the piston body 3 is in turn applied to the brake pad 11 through the connecting assembly 67. The transmittal of the restorative force generated by the elastomeric seal ring to the brake pad 11 positively withdraws the brake pad 11 from the rotor of the caliper brake 7 much faster than when relative torsional forces are relied upon to cause such separation, thereby advantageously reducing parasitic braking. The consequent reduction in parasitic braking increases gas mileage and the life of the brake pad 11.

Figure 4:
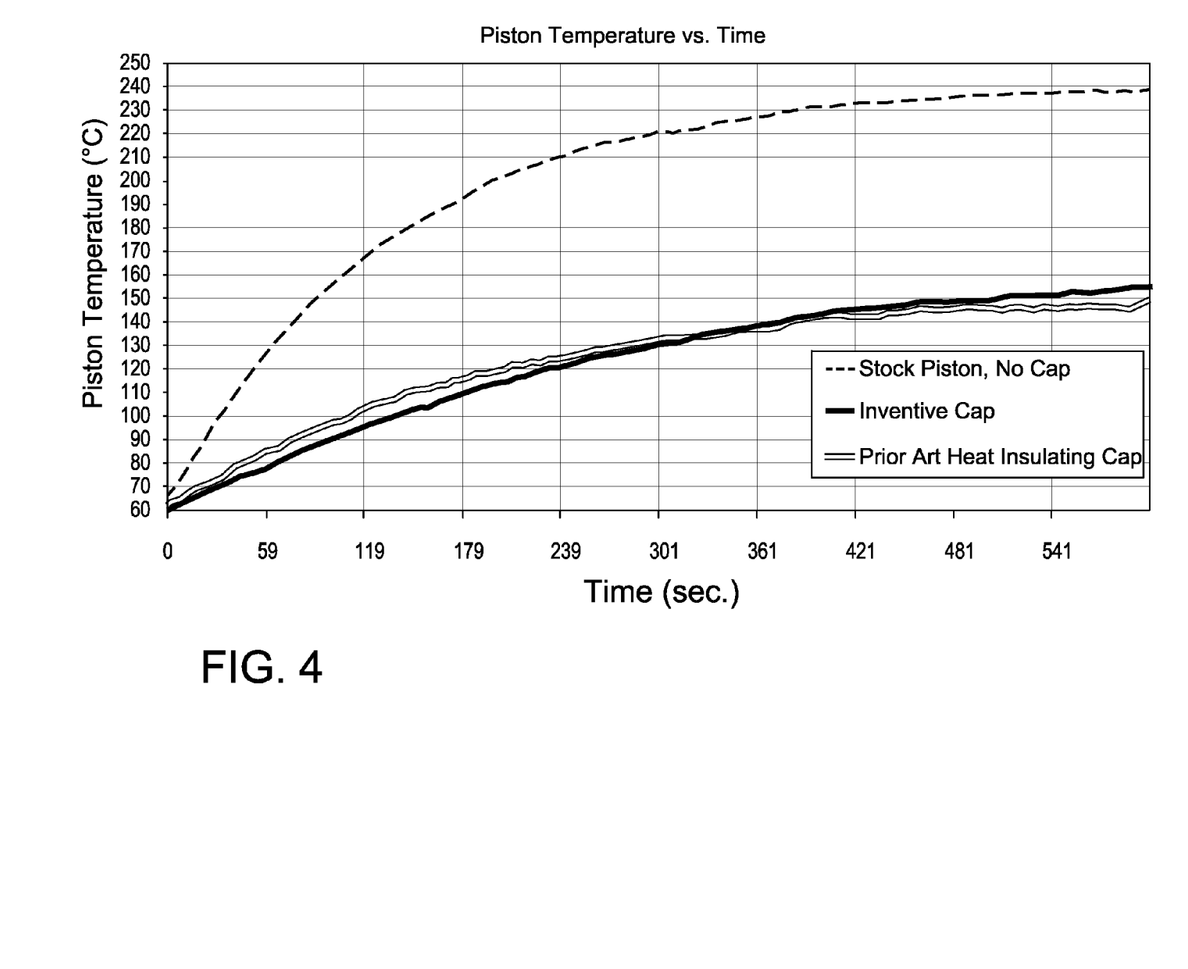
FIG. 4 is a graph comparing the heat loss characteristics over a protracted braking operation of (1) a non-cap type piston assembly; (2) a piston cap assembly using a thermally insulative ring between the cap and the piston body, and (3) the air cooled piston cap assembly of the invention.

FIG. 4 are graphs comparing the relative heat loss characteristics of (1) a non-cap type piston assembly (dotted line); (2) a piston cap assembly using a thermally insulative ring between the cap and the piston body (solid white line), and (3) the air cooled piston cap assembly 1, 65 in accordance with the invention (solid black line). The vertical axis represents piston temperature in degrees Centigrade, while the horizontal axis represents the time taken for a protracted braking action which might occur, for example, when a vehicle is descending a long and steep slope. After the first minute of such a braking action, the temperature of a stock piston having no provisions for promoting heat loss is approximately 127° C. By contrast, the temperature of a prior art piston cap assembly using a heat insulative ring is approximately 85° C., while the temperature of the piston cap assembly of the invention is only 78° C. These differences become even more extreme after the second minute of a braking operation. At this point in time, the temperature of a stock piston having no heat loss provisions has risen to approximately 168° C. By contrast, the temperature of a prior art piston cap assembly using a heat insulative ring is approximately 103° C., while the temperature of the piston cap assembly of the invention is only 95° C. To assist the reader in appreciating the safety consequences of the graphs shown in FIG. 4, the following table and information pertinent to brake fluid boiling points is offered:

Brake fluids have "dry" and "wet" boiling points. Wet boiling point, which is usually much lower (although above most normal service temperatures), refers to the fluid's boiling point after absorbing a certain amount of moisture This is several (single digit) percent, varying from formulation to formulation. In the table below, "wet boiling point" is the boiling point after absorption of 3.7% water by volume. The most common brake fluids are glycol-ether/dot three/dot four/dot five point one brake fluids, and are hygroscopic which means they absorb moisture from the atmosphere under normal humidity levels.

| Boiling Points for Common Braking Fluids | | |
|---|---|---|
| | Dry boiling point | Wet boiling point |
| DOT 3 | 205° C. (401° F.) | 140° C. (284° F.) |
| DOT 4 | 230° C. (446° F.) | 155° C. (311° F.) |
| DOT 5 | 260° C. (500° F.) | 180° C. (356° F.) |
| DOT 5.1 | 270° C. (518° F.) | 190° C. (374° F.) |

Accordingly, after only two minutes of a braking operation, a brake piston having no heat loss provisions is hot enough (at 168° C.) to boil two common types of brake fluid at their "wet" boiling points, and after three minutes is hot enough (at 192° C.) to boil every common type of brake fluid at their "wet" boiling points. By contrast, after three minutes, neither a prior art piston cap assembly using a heat insulative ring nor the piston cap assembly of the invention (at 115° C. and 110° C.) even begins to approach the "wet" boiling points of any of the brake fluids in the table. Moreover, the lower temperatures of the prior art piston cap assembly using a heat insulative ring and the inventive piston cap assembly substantially reduces the risk of seal damage.

But while the heat loss characteristics of the prior art piston cap assembly and the inventive piston cap assembly generally track one another over time, there are two important ways in which the inventive piston cap assembly constitutes a substantial improvement over the prior art piston cap assembly. First, the inventive piston cap assembly achieves such advantageous heat loss characteristics without the use of a relatively expensive heat insulating ring disposed between the piston body 3 and the piston cap 5. Instead, the annular air gap 62 provides an impediment to heat transfer from the underside 52 of the pad contacting portion 44 of the piston cap 5 and the top edge 22 of the piston body 3. In addition to reducing expense, the elimination of the heat insulating ring also makes the piston cap assembly of the invention easier to assemble, more durable, and more robust compared to piston cap assemblies that include a heat insulating ring.

Figure 5A:
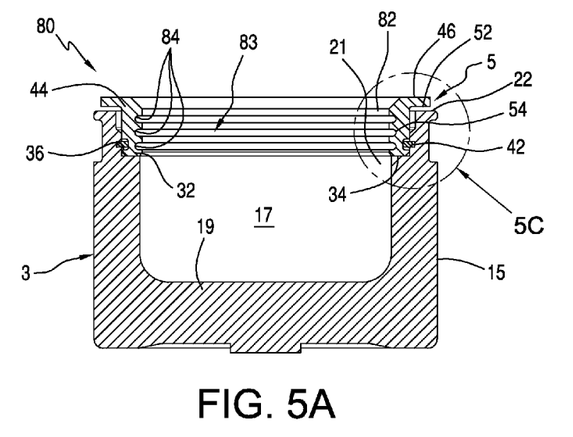
FIGS. 5A and 5B are a side sectional view and an end view of a third embodiment of the air cooled piston cap assembly of the invention.
Figure 5B:
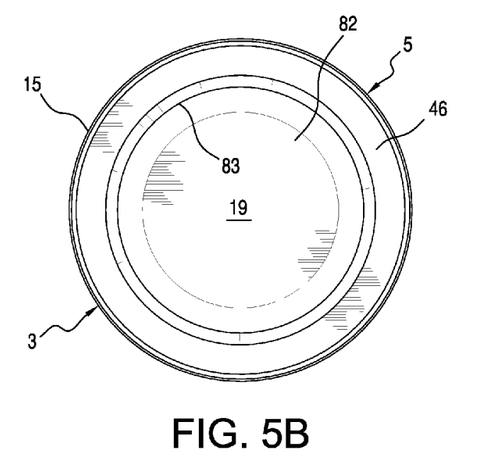
Figure 5C:
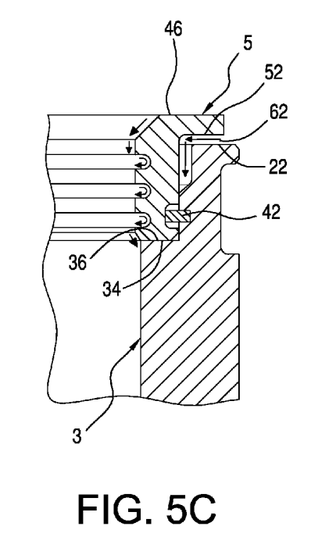
FIG. 5C is an enlarged view of the area circled in FIG. 5B, illustrating the both the air gap provided in the piston assembly and the extended heat transfer path provided by the shape of the piston cap.

FIGS. 5A, 5B and 5C illustrate a third embodiment 80 of the piston cap assembly of the invention. Like the previously described embodiments, this piston cap assembly 80 includes a piston body 3 and a piston cap 5 which may be used in caliper brakes. Again, the piston body 3 and piston cap 5 may be composed of metal, stainless steel, metal alloy, or any other suitable composition. In this particular embodiment, it is preferable that the piston cap 5 be formed from stainless steel in view of the relatively low heat conductivity of such a material as compared to carbon steel, and the somewhat shorter heat transfer path as compared to the FIG. 1 embodiment. The piston body 3 comprises a cylindrical side wall 15, a hollow interior 17, a closed end 19, an open end 21, and a top edge 22. The piston cap 5 includes a retention portion 32 that is structured and arranged to be received in the open end 21 of the piston body 3 and mounted over an annular ledge 34. A spring retention ring 42 secures the piston cap 5 in a substantially fixed spatial relationship with the piston body 3 in the same manner as previously described with respect to the embodiment shown in FIG. 1. The piston cap 5 additionally includes a pad contacting portion 44 having an annular contact face 46 that surrounds a circular opening 82, and an intermediate portion 54 connecting the retention portion 32 and the pad contacting portion 44. The annular contact face 46 protrudes slightly from the front end of the pad contacting portion 44 and engages the backing plate of the brake pad during operation.

An air gap 62 best seen in FIG. 5C is defined between the top edge 22 of the piston body 3 and an undersurface 52 of the contacting portion 44 of the piston cap 5. A non-linear heat path (indicated by the two arrows at right angles) is defined along the undersurface 52 of the pad contacting portion 44 and the outer surface of the of the piston cap 5. In this embodiment 80, the intermediate portion 54 of the piston cap 5 includes an inner wall 83 that is circumscribed by a plurality of annular grooves or flutes 83. These flutes 83 extend the length of a heat transfer path along the inner surface of the piston cap (also indicated by arrows in FIG. 3C) between the brake pad assembly and the piston body 3 to be longer than a linear path parallel to the axis of rotation of the assembly 80. As the piston cap 5 of this particular embodiment is not attached to the backing plate of the brake pad assembly, some amount of air circulation can occur through the circular opening 82 at the end of piston cap 5 such that some air flows over the inner wall 83 of the intermediate portion. This embodiment 80 illustrates that the length of the heat transfer path may be extended on the inner wall of the intermediate portion 54 by the presence of annular flutes 83, and that an opening such as the circular opening 82 may be provided to assist in cooling the inner wall of the intermediate portion 54.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A piston cap assembly particularly adapted for use in a disc brake caliper, comprising:
    a piston body slidably movable within a caliper bore along a central axis and having an end in contact with hydraulic fluid,
    a piston cap having a retention portion resting on an annular ledge within the piston body, a contact portion opposite from the retention portion that contacts a brake pad assembly, and an intermediate portion connecting the retention portion with the contact portion,
    wherein exterior surfaces of the contact portion, intermediate portion and retention portion define a heat transfer path between said brake lining and piston body, and
    wherein an air gap is defined between a top edge of the piston body and an undersurface of the contact portion of the piston cap allowing air to circulate over the heat transfer path, the heat transfer path between said brake lining and said piston body extended by the shape of the piston cap so that it is longer than a linear path parallel to said axis between the contact portion and the piston body,
    wherein the contact portion of the piston cap includes a central recess or opening such that only an outer periphery of the contact portion contacts a brake lining, and
    wherein the intermediate portion is formed from solid metal and functions as a heat sink for heat received from the contact portion of the piston cap.

2. The piston cap assembly of claim 1, wherein the shape of a contact surface of the contact portion contacting the brake pad is different from the shape of the end of the piston body supporting the piston cap in order to reduce vibration and noise during a braking operation.

3. The piston cap assembly of claim 1, wherein the intermediate portion is formed from solid metal and functions as a heat sink for heat received from the contact portion of the piston cap.

4. The piston cap assembly of claim 1, wherein the retention portion of the piston cap and said end of the piston body that supports said piston cap each include a groove to receive a spring retainer that mounts the piston cap to the piston body.

5. A piston cap assembly particularly adapted for use in a disc brake caliper, comprising:
    a piston body slidably movable within a caliper bore along an axis and having a closed end in contact with an actuator, and a force contact end,
    a piston cap having a retention portion mounted within the force contact end of and resting on an annular ledge within the piston body, a contact portion opposite from the retention portion that contacts a brake lining, and an intermediate portion connecting the retention portion with the contact portion,
    wherein exterior surfaces of the contact portion, intermediate portion and retention portion define a heat transfer path between said brake lining and piston body,
    wherein an air gap is defined between a top edge of the piston body and an undersurface of the contact portion of the piston cap that allows air to circulate over the heat transfer path, and a diameter of the intermediate portion across said axis is different than the diameter of the contact portion to extend the heat transfer path so that said heat transfer path is longer than a linear path parallel to said axis between the contact portion and the piston body,
    wherein the contact portion of the piston cap includes a central recess or opening such that only an outer periphery of the contact portion contacts a brake lining, and
    wherein the intermediate portion is formed from solid metal and functions as a heat sink for heat received from the contact portion of the piston cap.

6. The piston cap assembly of claim 5, wherein the intermediate portion of the piston cap includes a substantially hourglass-shaped sidewall between the contact portion and retention portion and the hourglass-shaped sidewall defines an air volume between an exterior surface of the piston cap and an interior surface of the piston body which communicates with said air gap.

7. A piston cap assembly particularly adapted for use in a disc brake caliper, comprising:
    a piston body slidably movable within a caliper bore along a central axis and having an end in contact with hydraulic fluid, a piston cap having a retention portion mounted on an end of the piston body opposite from the end in contact with hydraulic fluid, a contact portion opposite from the retention portion that contacts a brake lining, and an intermediate portion connecting the retention portion with the contact portion, wherein both exterior and interior walls of the intermediate portion define a heat transfer path between said brake lining and piston body, wherein a shape of the piston cap extends the length of the heat transfer path to be longer than a linear path parallel to said axis between the contact portion and the piston body, and an air gap is defined between a top edge of the piston body and an undersurface of the contact portion of the piston cap that allows air to circulate over the heat transfer path defined along said exterior walls, wherein the intermediate portion of the piston cap includes an inner wall having at least one annular flute for extending the heat transfer path between the contact portion and the retention portion, and the piston cap includes an open end that allows air to circulate over the inner wall, and wherein the intermediate portion is formed from solid metal and functions as a heat sink for heat received from the contact portion of the piston cap.

8. A piston cap assembly particularly adapted for use in a disc brake caliper, comprising:

a piston body slidably movable within a caliper bore along an axis and having a closed end in contact with an actuator, and a force contact end, a piston cap having a retention portion mounted within the force contact end of the piston body, a contact portion opposite from the retention portion that contacts a brake lining, and an intermediate portion connecting the retention portion with the contact portion, wherein exterior surfaces of the contact portion, intermediate portion and retention portion define a heat transfer path between said brake lining and piston body, wherein an air gap is defined between a top edge of the piston body and an undersurface of the contact portion of the piston cap that allows air to circulate over the heat transfer path, and a diameter of the intermediate portion across said axis is different than the diameter of the contact portion to extend the heat transfer path so that said heat transfer path is longer than a linear path parallel to said axis between the contact portion and the piston body, wherein the contact portion of the piston cap includes a central recess or opening such that only an outer periphery of the contact portion contacts a brake lining, wherein the intermediate portion is formed from solid metal and functions as a heat sink for heat received from the contact portion of the piston cap, and includes a substantially hourglass-shaped sidewall between the contact portion and retention portion and the hourglass-shaped sidewall defines an air volume between an exterior surface of the piston cap and an interior surface of the piston body which communicates with said air gap.

\* \* \* \* \*